3,700,626
FLAME-RETARDED POLYMER COMPOSITIONS
Robert William Murray, Lebanon, N.J., assignor to American Cyanamid Company, Stamford, Conn.
No Drawing. Filed May 20, 1970, Ser. No. 39,156
Int. Cl. C08f 45/60
U.S. Cl. 260—45.8 R       10 Claims

ABSTRACT OF THE DISCLOSURE

Flame-retarded compositions comprising a thermoplastic polymer and a flame-retarding amount of 1,1,4,4-tetrakis(2-cyanoethyl) - 1,4 - diphosphoniacyclohexane dibromide or diiodide, are disclosed.

BACKGROUND OF THE INVENTION

This invention relates to novel flame-retarded compositions comprising thermoplastic polymers having incorporated therein either 1,1,4,4-tetrakis(2-cyanoethyl)-1,4 - diphosphoniacyclohexane dibromide (hereinafter sometimes called TDPB) or 1,1,4,4-tetrakis(2-cyanoethyl)-1,4-diphosphoniacyclohexane diiodide (hereinafter sometimes called TDPI) or mixtures thereof. It has been found that these two compounds are usually effective in their ability to flame-proof thermoplastic polymers, especially at concentrations materially lower than related compounds.

For example, U.S. Pat. No. 3,309,425 teaches the use of various tetraalkyl substituted diphosphoniacyclohexane halides as flame-proofing agents for many thermoplastic resins. The use of these tetraalkyl salts, however, necessitates the incorporation of large amounts of additives, a factor which ofttimes results in the reduction of or subtraction from the desired properties of the polymer.

SUMMARY

It has now been discovered that thermoplastic polymers can be rendered flame-retarded by the incorporation therein of TDPB, TDPI or mixtures thereof in amounts heretofore not believed possible of this class of compounds. As a result, the more favorable properties of the polymers to which the additives are added are not deleteriously affected and therefore the flameproofed polymers can generally be used for the same service applications as the polymers per se.

DESCRIPTION OF THE INVENTION INCLUDING PREFERRED EMBODIMENTS

As mentioned above, it has now unexpectedly been discovered that TDPB or TDPI can be added in relatively small amounts to thermoplastic polymers in order to render them flame-retardant.

The TDPB and TDPI are not new compounds and, in fact, they are disclosed and claimed, along with methods for their production, in U.S. Pat. No. 3,206,496, which patent is hereby incorporated herein by reference. These halides may be incorporated into the thermoplastic polymers in flame-retarding amounts i.e. generally amounts ranging from about 1.0% to about 10%, by weight, based on the weight of the polymer to which they are added.

In general, any thermoplastic polymeric material may be rendered flame-retardant by the incorporation therewith of the above-identified flame-retardant compounds. Generally, however, the vinyl type polymers, wherein a monomeric material is polymerized, by known methods, e.g., by use of free-radical generating catalysts, irradiation, anionic and cationic catalysts, etc., are those preferred. Examples of the vinyl type polymers which may be used to form my novel compositions are the polyvinyl acetates, polyvinylbutyral, butadiene copolymers, e.g., acrylonitrilebutadiene-styrene copolymers, the polyacrylonitriles, polybutadiene, polyaldehydes such as polyoxymethylene, and the like. Additionally, and even more preferably, one may incorporate the flame-retardant compounds mentioned above into such polymers as the α-olefin polymers, such as the homopolymers and copolymers, etc., containing, as the major constituent thereof, ethylene, propylene, including polyethylene, polypropylene, copolymers thereof and the like and the acrylate and methacrylate homopolymers and copolymers produced from monomers having the formula (I) 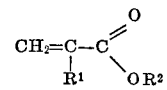

wherein $R^1$ is hydrogen or a methyl radical and $R^2$ is hydrogen or an alkyl radical having from 1 to 6 carbon atoms, inclusive. Examples of monomers represented by Formula I include acrylic acid, methyl acrylate, ethyl acrylate, n-propyl acrylate, isopropyl acrylate, n-butyl acrylate, t-butyl acrylate, isobutyl acrylate, n-amyl acrylate, hexyl acrylate and their corresponding alkyl methacrylates, etc.

Also such polymers as the polyamides, e.g., adipic acid-hexamethylenediamine reaction products; the cellulosics such as cellulose acetate (and/or butyrate, etc.); cellulose nitrate; the polycarbonates, e.g., phosgene-bisphenol A reaction products; the so-called impact polymers, i.e. rubber-polymer blends such as blends of polystyrene with 5-10% of butadiene-styrene; polyesters, polyurethanes, etc., and the like may be made flame-retardant by the incorporation therein of the compounds discussed hereinabove.

Further examples of other monomers which may be used to form the thermoplastic vinyl polymers encompassed by the present invention, polymerized either singularly or in combination with each other or with any other monomeric compounds set forth hereinabove, are such monomers as the unsaturated ethers, e.g., ethyl vinyl ether, diallyl ether, etc., the acrylamide and N-substituted acrylamides, e.g., N-methylol acrylamide, N-allyl acrylamide, N-methyl acrylamide, N-phenyl acrylamide, etc., the unsaturated ketones, e.g., methyl vinyl ketone, methyl allyl ketone, etc.; methylene malonic esters, e.g., methylene methyl malonate, etc., and the like.

Additional examples of monomers which may be used to form the thermoplastic vinyl polymers encompassed by the present invention, also polymerized either singularly or in combination with each other or with the other compounds set forth hereinabove, are such monomers as the unsaturated alcohol esters, more particularly the allyl, methallyl, vinyl, methvinyl, butenyl, etc., unsaturated esters of aliphatic and aromatic monobasic acids such, for instance, as propionic, crotonic, succinic, glutaric, adipic, maleic, fumaric, itaconic, benzoic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic acids, illustrative examples of which appear above; vinyl cyclic compounds (including monovinyl aromatic hydrocarbons) e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl pyridine, divinyl benzene, diallyl benzene, the various allyl cyanostyrenes, the various alpha-substituted styrenes and alpha-substituted ring-substituted styrenes, e.g., alpha-methyl styrene, alpha-methyl-para-methyl styrene, and the like.

Other examples of monomers that can be used as polymers to form the resin portion of the novel flame-retardant compositions are the vinyl halides, more particularly, vinyl fluoride, vinyl chloride, vinyl bromide, and vinyl iodide, and the various vinylidene compounds, including the vinylidene halides, e.g., vinylidene chloride, vinylidene bromide, vinylidene fluoride, and vinylidene iodide, other comonomers being added, if needed, in order to improve the compatibility and copolymerization characteristics of the mixed monomers.

More specific examples of allyl compounds that can be polymerized to useful polymers, useful in the production of the novel flame-retardant compositions, are allyl alcohol, methallyl alcohol, diallyl carbonate, allyl lactate, allyl alphahydroxyisobutyrate, allyl trichlorosilane, diallyl phthalate, diallyl methylgluconate, diallyl tartronate, diallyl tartrate, diallyl mesaconate; the diallyl ester of muconic acid, diallyl chlorophthalate, diallyl dichlorosilane, the diallyl ester of endomethylene tetrahydrophthalic anhydride, triallyl tricarballylate, triallyl cyanurate, triallyl citrate, triallyl phosphate, tetrallyl silane, tetrallyl silicate, hexallyl disiloxane, allyl diglycol carbonate, etc.

These above-mentioned monomers may be polymerized, copolymerized, etc., in any known manner such as by free-radical generating catalysts, irradiation, anion and cation type catalysts and the like, said method of polymerization forming no part of the present invention.

The halides can be incorporated into the resins by any known method. That is to say, the flame-retardant additive may be added to the resin by milling the resin and the halide on, for example, a two-roll mill, in a Banbury mixer, etc., or the halide may be added by molding it and the resin simultaneously, extruding the halide and resin or by merely blending the resin in powder form with the halide and thereafter forming the final desired article. Additionally, the halide may also be added during the resin manufacture, i.e., during the polymerization procedure by which the resin is made, provided the catalyst, etc., and other ingredients of the polymerization system are inert thereto.

The production of thermoplastic resin compositions which are flame retardant, i.e. have high resistance to heat, is of considerable commercial importance. For example, such articles as castings, moldings, foamed or laminated structures and the like are required, or at least desired, to be resistant to fire and flame and to possess the ability to endure heat without deterioration. Typical illustrations of such applications can be found in castings for live electrical contacts which should not be ignited or deteriorated by heat and sparks. Structural members such as pipes, wall coverings, wall paneling, windows and items such as ash trays, waste baskets, fibers and the like are further example of products wherein flame retardance is desirable.

It is also within the scope of the instant invention to incorporate such ingredients as plasticizers, dyes, pigments, heat and light stabilizers, antioxidants, antistatic agents, photochromic materials and the like into the polymeric flame-retarded polymer compositions claimed herein.

The following examples are set forth for purposes of illustration only and are not to be construed as limitations on the present invention except as set forth in the appended claims. All parts and percentages are by weight unless otherwise specified.

METHOD OF TESTING

Any appropriate flame-retardance test may be used to determine the flame-retardant properties of any of the flame-retarded compositions of the instant invention. One test found to be reasonably efficient is a modified version of that test identified as ASTM–D–635–56T. The specifications for this test are: a cylindrical extrudate 6" in length and 0.045" in diameter is prepared using a melt index apparatus (ASTM–D–1238–62T), marked at the 1" and 4" lengths and then supported with its longitudinal axis horizontal. A Bunsen burner with a 1" blue flame is placed under the free end of the strip and is adjusted so that the flame tip is put in contact with the strip end nearest the 1" marking. At the end of 30 seconds, the flame is removed and the specimen is allowed to burn. If the specimen does not continue to burn after the first ignition, it is immediately recontacted with the burner for another 30 seconds. If, after the two burnings, the strip is not burned to the 1" mark, the specimen is designated as "non-burning." If the specimen has burned to the 1" mark but not to the 4" mark it is designated as "self-extinguishing."

Example 1

Ninety-five (95) parts of polypropylene and five (5) parts of 1,1,4,4-tetrakis(2-cyanoethyl)-1,4-diphosphoniacyclohexane dibromide are dry blended on a two-roll mill. The resultant composition is extruded into 0.045" cylinders, 6" in length using a melt index apparatus (ASTM–D–1238–62T) and subjected to the above-described flame-retardance test. The extrudates pass the test and are designated as self-extinguishing.

Example 2

The procedure of Example 1 is again followed except that the corresponding diiodide is used in place of the dibromide. Again a self-extinguishing designation is indicated for the specimen.

Example 3

The procedure of Example 2 is again followed except that the polypropylene is replaced by polyethylene. A self-extinguishing composition is produced.

Example 4

When the polyethylene of Example 3 is replaced by a commercially available ethylene-propylene copolymer, subjection of the resultant composition to the above-described flame-test results in a self-extinguishing designation therefor.

I claim:
1. A flame-retardant composition comprising a poly (mono-olefin) and a flame-retarding amount of 1,1,4,4-tetrakis(2 - cyanoethyl)-1,4-diphosphoniacyclohexane dibromide or 1,1,4,4-tetrakis-(2-cyanoethyl)-1,4-diphosphoniacyclohexane diiodide.
2. A composition according to claim 1 wherein said polyolefin is polypropylene.
3. A composition according to claim 1 wherein said polyolefin is polyethylene.
4. A composition according to claim 1 wherein said polyolefin is an ethylene-propylene copolymer.
5. A composition according to claim 1 containing 1,1,4,4-tetrakis(2-cyanoethyl) - 1,4 - diphosphoniacyclohexane dibromide.
6. A composition according to claim 1 containing 1,1,4,4-tetrakis(2 - cyanoethyl) - 1,4 - diphosphoniacyclohexane diiodide.

7. A composition according to claim 5 wherein said polyolefin is polyethylene.

8. A composition according to claim 5 wherein said polyolefin is polypropylene.

9. A composition according to claim 6 wherein said polyolefin is polyethylene.

10. A composition according to claim 6 wherein said polyolefin is polypropylene.

References Cited

UNITED STATES PATENTS

| | | | |
|---|---|---|---|
| 3,206,496 | 9/1965 | Rauhut | 260—464 |
| 3,214,434 | 10/1965 | Grayson et al. | 106—15 |
| 3,309,425 | 3/1967 | Gillham et al. | 260—45.8 |
| 3,530,164 | 9/1970 | Gillham et al. | 260—45.8 |

OTHER REFERENCES

Stabilization of Polymers and Stabilizer Processes, published by the American Chemical Society, Washington, D.C., 1968.

DONALD E. CZAJA, Primary Examiner

V. P. HOKE, Assistant Examiner

U.S. Cl. X.R.

106—15 FP